United States Patent [19]

Espinosa et al.

[11] Patent Number: 4,500,826

[45] Date of Patent: Feb. 19, 1985

[54] VARIABLE SPEED ELECTRIC INDUCTION MOTORS WITHOUT BRUSHES

[76] Inventors: Fausto L. Espinosa; Cesar L. Nunez, both of Braque 4284, Miravalle, Gaudalajara, Jalisco, Mexico

[21] Appl. No.: 504,373

[22] Filed: Jun. 14, 1983

[51] Int. Cl.³ .............................................. H02P 5/40
[52] U.S. Cl. .................................... 318/820; 318/821
[58] Field of Search ............... 318/731, 732, 820, 821, 318/825, 828, 798, 805; 310/68 D, 68 B, 72, 212

[56] References Cited

U.S. PATENT DOCUMENTS

| | | | |
|---|---|---|---|
| 3,335,348 | 8/1967 | Gossel | 318/781 |
| 4,243,926 | 1/1981 | Phillips | 318/798 |
| 4,329,603 | 5/1982 | Ballard | 310/68 D |

FOREIGN PATENT DOCUMENTS 1020643  2/1966  United Kingdom ............... 318/821

Primary Examiner—David Smith, Jr.
Attorney, Agent, or Firm—Anthony A. O'Brien

[57] ABSTRACT

A variable speed induction motor includes a photo-electric cell which controls the current delivered the rotor induction coils. The control is effectuated by the use of controlled diodes, the control electrodes of which are electrically connected to the photo-electric cell. The resistance of the photo-electric cell can be varied by an external, operator-controlled light source. Thus, the speed of the motor, which is proportional to the current in the induction coils, is controlled by the operator through the use of the light source.

2 Claims, 2 Drawing Figures

VARIABLE SPEED ELECTRIC INDUCTION MOTORS WITHOUT BRUSHES

BACKGROUND OF THE INVENTION

1. Field of the Invention

The invention relates generally to three-phase induction motors and particularly to a device for controlling the speed of an induction motor without the use of brushes.

2. Description of the Prior Art

In the art of varying speeds in electric motors and, through them, in electric machinery various alternatives are under development, one of the most usual being the direct current motor, the motor using eddy currents, the one using parasite currents, the one with slip-rings and others not as common, such as the variable frequency motor, which is highly complicated, and also the Schrague motor: not to mention the various mechanical systems such as pulleys and conical rotors, and some electromagnetic types with variable coils within the motor which change from delta to star, or even with very special coils in its primary and secondary stages, in order to provide induced voltage, control voltage, drive voltage, regulatable exciter voltages and line voltages.

Generally speaking, the hoped-for results have been obtained insofar as variable speed is concerned, but the specialization of these motors has been maintained, making them expensive and difficult to produce.

Industry has been deprived of the application of variable-speed on a large scale by the costs, and also by the difficulty of maintenance and the repair of motors, even ordinary ones such as those with direct current which—cause problems through their brushes and collectors.

Electric motors without brushes, if they are controlled by frequencies in order to make them variable-speed, do not present the same problems of brushes, collectors, etc. but on the other hand the electronic control is so complicated and costly that even the manufacturers are careful not to recommend it.

A variable speed, electric induction motor includes a triphasic stator, a rotor shaft having a rotor mounted thereon, the rotor having longitudinal grooves on an outer face thereof carrying three induction coils. The improvement includes a light-dependent resistance mounted on an end of the rotor shaft, four controlled diodes mounted in two pairs on the rotor, each diode having a control electrode and each pair of the diodes connected to one of the induction coils. The light dependent resistance is electrically connected to the control electrodes such that the current flowing to the control electrodes is dependent on the light incident on the light-dependent resistance.

The object of the present invention is to provide variable-speed-electric induction motors without brushes.

It is also the object of the present invention that the motor should use alternating current and should feed directly off the fixed frequency circuit, even though it is of variable speed.

DESCRIPTION OF THE PREFERRED EMBODIMENT

With the help of the drawings the functioning of the special characteristics of the invention should be self-explanatory. These are descriptive and not restrictive in that experts in the field would find it possible to make some modifications without altering the spirit of the invention.

Figure 1:
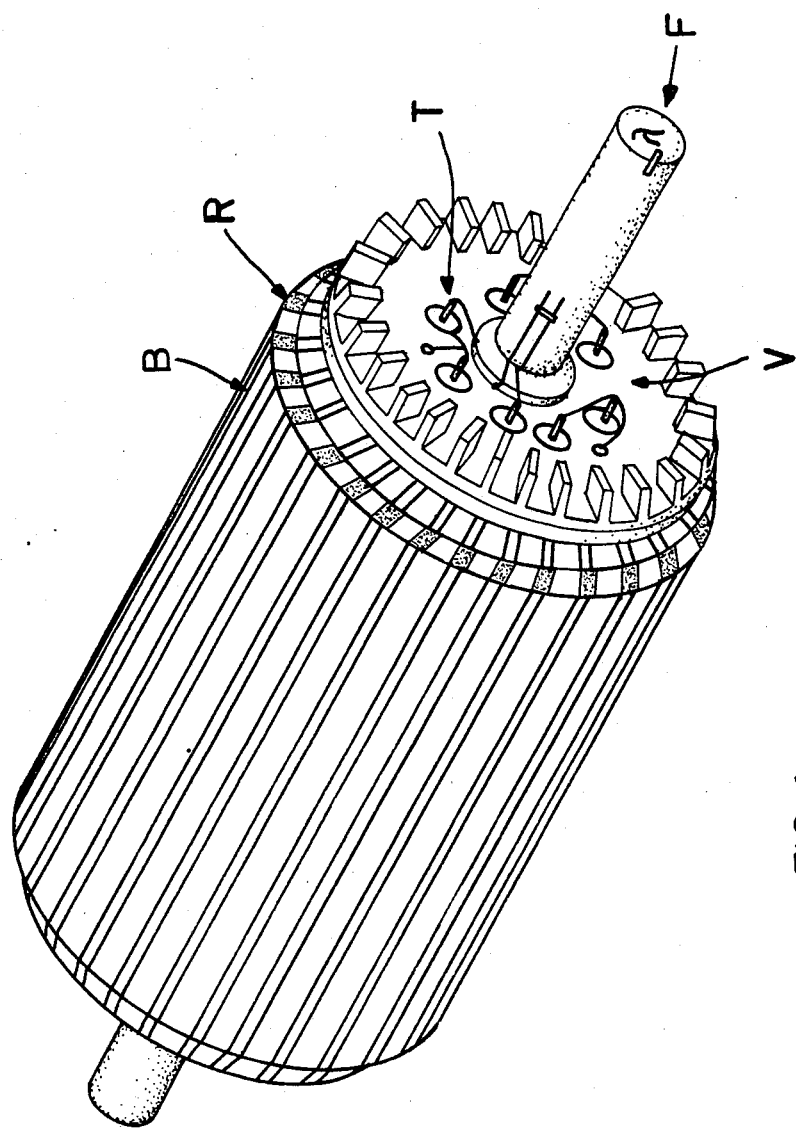
FIG. 1 shows the rotor of a motor with a coil, having a fan which supports the assembly of electronic elements, and, at the tip of the shaft, a photo-electric cell.

FIG. 1. illustrates a rotor of a squirrel-cage induction motor, in which some grooves (R) have been made in which coils (B) have been introduced whose functions are to penetrate the squirrel-cage of the motor with the grooves (R) so that the induced current cannot circulate without control, allowing, on the other hand, that these same currents can run through coils (B) but now controlled by the electrical semiconductors (T) which are found mounted on the fan (V).

Figure 2:
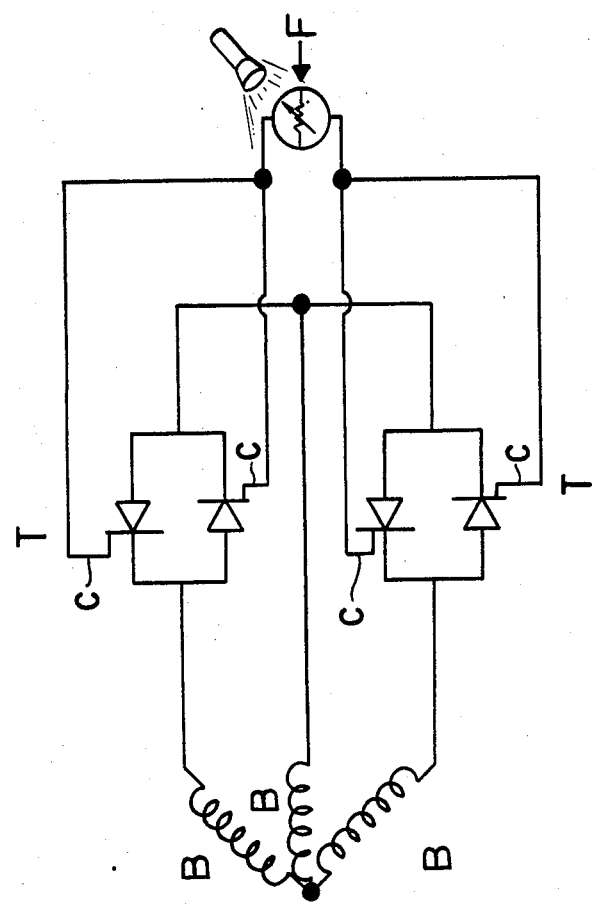
FIG. 2 shows the electrical connections of the electronic components mounted on the rotor which is shown in FIG. 1.
Figure 2:
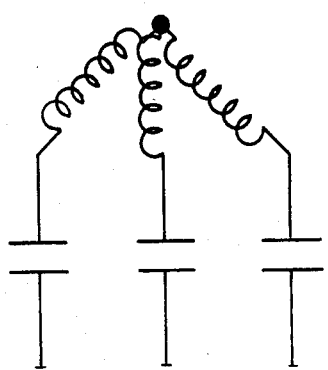

FIG. 2. shows how the coils (B) mounted in the grooves (R) (FIG. 1) are connected to the semiconductors (T) of thyristor type in order for the induced current to be regulated through them.

As is well known, the semiconductors of the thyristor type (t) can be controlled by applying a positive signal through the control electrode (C). The resistance of the photo-electric cell (F) is inversely proportional to the amount of light incident thereon. Thus, the the amount of current passing to the control electrode (C) of the thyristors increases as the light incident on the photo-electric cell (F) causes the impedance of that device to drop. The increase in current delivered to the control electrodes (C) of the thyristor (T) causes a resultant increase in the current delivered to the coils (B). The photo-electric cell (F) is mounted on the rotor shaft assembly (FIG. 1) where it can be exposed to an operator controlled external light source (not shown).

Also it is well known that the photo-voltage element changes its electrical characteristics in accordance with the variations of light to which it is exposed.

Using the above-described parts we can take advantage of the following characteristics:

1st. The squirrel-cage motors revolve according to the induced currents in their rotors.

2nd. The induced currents in the rotor are now those which circulate through the coils (B).

3rd. The currents in the coils (B) are those which are fed through the electronic semiconductors (T).

4th. The currents from the semiconductors (T) are regulated through their control electrodes (C) by the light which comes from the photo-electric cell (F).

If we tske into account that these characteristics are not altered by being contained in the rotor of a motor which is turning, also that the photoelectric cell can be made to alter merely by regulating the lights, the system describes gives one a squirrel-cage induction motor with an electronic rotor which converts it to a variable-speed motor regulated by light.

What is claimed is:

1. An improved variable speed, electric induction motor comprising
a triphasic stator;
a rotor shaft;
a rotor mounted on said shaft, said rotor having longitudinal grooves on an outer face thereof; and three induction coils carried in said rotor grooves;
wherein the improvement comprises
a light-dependent resistance mounted on an end of said rotor shaft;
four controlled diodes mounted in two pairs on said rotor, each of said diodes having a control electrode and each pair of said diodes being electrically connected to one of said induction coils;
said light-dependent resistance being electrically connected to said control electrodes whereby current flowing to said control electrodes is dependent on the light incident on said light-dependent resistance.

2. An improved variable speed, electric induction motor as claimed in claim 1, wherein
said controlled diodes are thyristors, and
said light dependent resistance is a photo-electric cell.

* * * * *